US012591904B2

(12) United States Patent
Deragon et al.

(10) Patent No.: US 12,591,904 B2
(45) Date of Patent: Mar. 31, 2026

(54) METHODS AND APPARATUS TO DETERMINE UNIFIED ENTITY WEIGHTS FOR MEDIA MEASUREMENT

(71) Applicant: The Nielsen Company (US), LLC, New York, NY (US)

(72) Inventors: Joshua T. Deragon, Pittsburgh, PA (US); David J. Kurzynski, Elgin, IL (US); Denis Voytenko, Oldsmar, FL (US); Horalia Armas, Palatine, IL (US); William Deshong, Virginia Beach, VA (US); Brett Gebhardt, Los Angeles, CA (US)

(73) Assignee: The Nielsen Company (US), LLC, New York, NY (US)

( * ) Notice: Subject to any disclaimer, the term of this patent is extended or adjusted under 35 U.S.C. 154(b) by 110 days.

(21) Appl. No.: 17/976,591

(22) Filed: Oct. 28, 2022

(65) Prior Publication Data

US 2023/0394510 A1     Dec. 7, 2023

Related U.S. Application Data

(60) Provisional application No. 63/349,487, filed on Jun. 6, 2022.

(51) Int. Cl.
*G06Q 10/00*          (2023.01)
*G06F 16/28*          (2019.01)
*G06Q 30/0204*          (2023.01)

(52) U.S. Cl.
CPC ....... *G06Q 30/0204* (2013.01); *G06F 16/285* (2019.01)

(58) Field of Classification Search
CPC ........... G06Q 30/0204; G06Q 30/0201; G06Q 30/0277; G06Q 10/063112; G06F 16/285
See application file for complete search history.

(56) References Cited

U.S. PATENT DOCUMENTS

| | | | | |
|---|---|---|---|---|
| 2010/0191723 A1* | 7/2010 | Perez | ..................... | G06Q 30/02 |
| | | | | 707/723 |
| 2011/0288907 A1* | 11/2011 | Harvey | .............. | G06Q 10/0639 |
| | | | | 705/7.29 |
| 2012/0254911 A1* | 10/2012 | Doe | ................... | H04N 21/4524 |
| | | | | 725/14 |
| 2014/0380350 A1* | 12/2014 | Shankar | ........... | H04N 21/25883 |
| | | | | 725/18 |
| 2015/0095138 A1* | 4/2015 | Rao | .................. | H04N 21/44226 |
| | | | | 705/14.41 |
| 2015/0229979 A1* | 8/2015 | Wood | ................. | H04N 21/4663 |
| | | | | 725/14 |

(Continued)

*Primary Examiner* — Brian M Epstein
*Assistant Examiner* — Reham K Abouzahra

(57) ABSTRACT

Methods, apparatus, systems, and articles of manufacture are disclosed to determine unified entity weights for audience measurement. Example apparatus disclosed herein are to obtain entity data associated with an entity over a period of time including a plurality of time segments, the entity data including an entity identifier, adaptable weights of the entity associated respectively with the time segments in the period of time, and panel statuses of the entity that correspond to respective ones of the time segments in the period of time, and average the adaptable weights based in the panel statuses to determine a unified weight of the entity for the period of time.

12 Claims, 8 Drawing Sheets

(56) References Cited

U.S. PATENT DOCUMENTS

| | | | |
|---|---|---|---|
| 2016/0269783 A1* | 9/2016 | Mowrer | H04N 21/44222 |
| 2017/0091786 A1* | 3/2017 | Sheppard | G06Q 30/0201 |
| 2018/0152760 A1* | 5/2018 | Venetucci | H04H 20/00 |
| 2018/0376184 A1* | 12/2018 | Sheppard | H04N 21/4667 |
| 2022/0303618 A1* | 9/2022 | Whitely | H04N 21/6582 |

* cited by examiner

300

UNIFIED MEAN WEIGHT FOR AN ENTITY

| Person | Day | Person Weight | Daily Intab Status | Intab Percent to Date | Unified Intab | Cumulative Sum | Intab Days | Mean (To Date) | Final Weight |
|---|---|---|---|---|---|---|---|---|---|
| 1 | 1 | 100 | 1 | 100.00% | 1 | 100 | 1 | 100 | 100.0 |
| 1 | 2 | 0 | 0 | 50.00% | 0 | 100 | 1 | 100 | 0.0 |
| 1 | 3 | 130 | 1 | 66.67% | 0 | 230 | 2 | 115 | 0.0 |
| 1 | 4 | 110 | 1 | 75.00% | 1 | 340 | 3 | 113.3333333 | 113.3 |
| 1 | 5 | 105 | 1 | 80.00% | 1 | 445 | 4 | 111.25 | 111.3 |
| 1 | 6 | 120 | 1 | 83.33% | 1 | 565 | 5 | 113 | 113.0 |
| 1 | 7 | 110 | 1 | 85.71% | 1 | 675 | 6 | 112.5 | 112.5 |
| 1 | 8 | 0 | 0 | 75.00% | 1 | 675 | 6 | 112.5 | 112.5 |
| 1 | 9 | 100 | 1 | 77.78% | 1 | 775 | 7 | 110.7142857 | 110.7 |
| 1 | 10 | 130 | 1 | 80.00% | 1 | 905 | 8 | 113.125 | 113.1 |
| 1 | 11 | 140 | 1 | 81.82% | 1 | 1045 | 9 | 116.1111111 | 116.1 |
| 1 | 12 | 125 | 1 | 83.33% | 1 | 1170 | 10 | 117 | 117.0 |
| 1 | 13 | 115 | 1 | 84.62% | 1 | 1285 | 11 | 116.8181818 | 116.8 |
| 1 | 14 | 110 | 1 | 85.71% | 1 | 1395 | 12 | 116.25 | 116.3 |
| 1 | 15 | 105 | 1 | 86.67% | 1 | 1500 | 13 | 115.3846154 | 115.4 |
| 1 | 16 | 100 | 1 | 87.50% | 1 | 1600 | 14 | 114.2857143 | 114.3 |
| 1 | 17 | 100 | 1 | 88.24% | 1 | 1700 | 15 | 113.3333333 | 113.3 |
| 1 | 18 | 0 | 0 | 83.33% | 1 | 1700 | 15 | 113.3333333 | 113.3 |
| 1 | 19 | 100 | 1 | 84.21% | 1 | 1800 | 16 | 112.5 | 112.5 |
| 1 | 20 | 100 | 1 | 85.00% | 1 | 1900 | 17 | 111.7647059 | 111.8 |

302  304  306  308  310  312  314  316  318  320

METHODS AND APPARATUS TO DETERMINE UNIFIED ENTITY WEIGHTS FOR MEDIA MEASUREMENT

RELATED APPLICATION

This patent claims the benefit of U.S. Provisional Patent Application No. 63/349,487, which was filed on Jun. 6, 2022. U.S. Provisional Patent Application No. 63/349,487 is hereby incorporated herein by reference in its entirety. Priority to U.S. Provisional Patent Application No. 63/349, 487 is hereby claimed.

FIELD OF THE DISCLOSURE

This disclosure relates generally to media measurement and, more particularly, to determination of unified entity weights for media measurement.

BACKGROUND

In recent years, audiences of digital media have extensive options for accessing content (e.g., shows, films, news, online videos, etc.) using numerous sources (e.g., cable, over the air (OTA), smart televisions (TVs), digital streaming devices, or alternate delivery systems (ADS), such as satellite, etc.). Tuning data (e.g., minutes viewed, content title, genre, daypart, demographic, device type, etc.) is collected to gather insights on audience exposure to the content and can include panel data and/or census data. Panel data is monitored and measured (e.g., via surveys, metering devices, sensors, background applications, etc.) for a panel of households and/or members to better understand characteristics of audiences that view particular stations and/or over the top (OTT) streaming services. The panel includes a subset of members with varying demographics to represent the larger population. The panel data can inform which panel members of the panel household are using a presentation device at a given time. Census data is collected in the form of return path data (RPD) and automated content recognition (ACR) data to complement the panel data. Census data monitors a much larger audience than the panel and includes information related to specific content accessed, content metadata, and engagement (e.g., number of viewing minutes) of the panel member(s). RPD can be gathered via a set-topbox (e.g., a cable or satellite box), and ACR data can be gathered via ACR devices integrated with or connected to Smart TVs (e.g., Vizio®) and/or hardware digital media devices (e.g., Roku®).

BRIEF DESCRIPTION OF THE DRAWINGS

In general, the same reference numbers will be used throughout the drawing(s) and accompanying written description to refer to the same or like parts.

Figure 1:
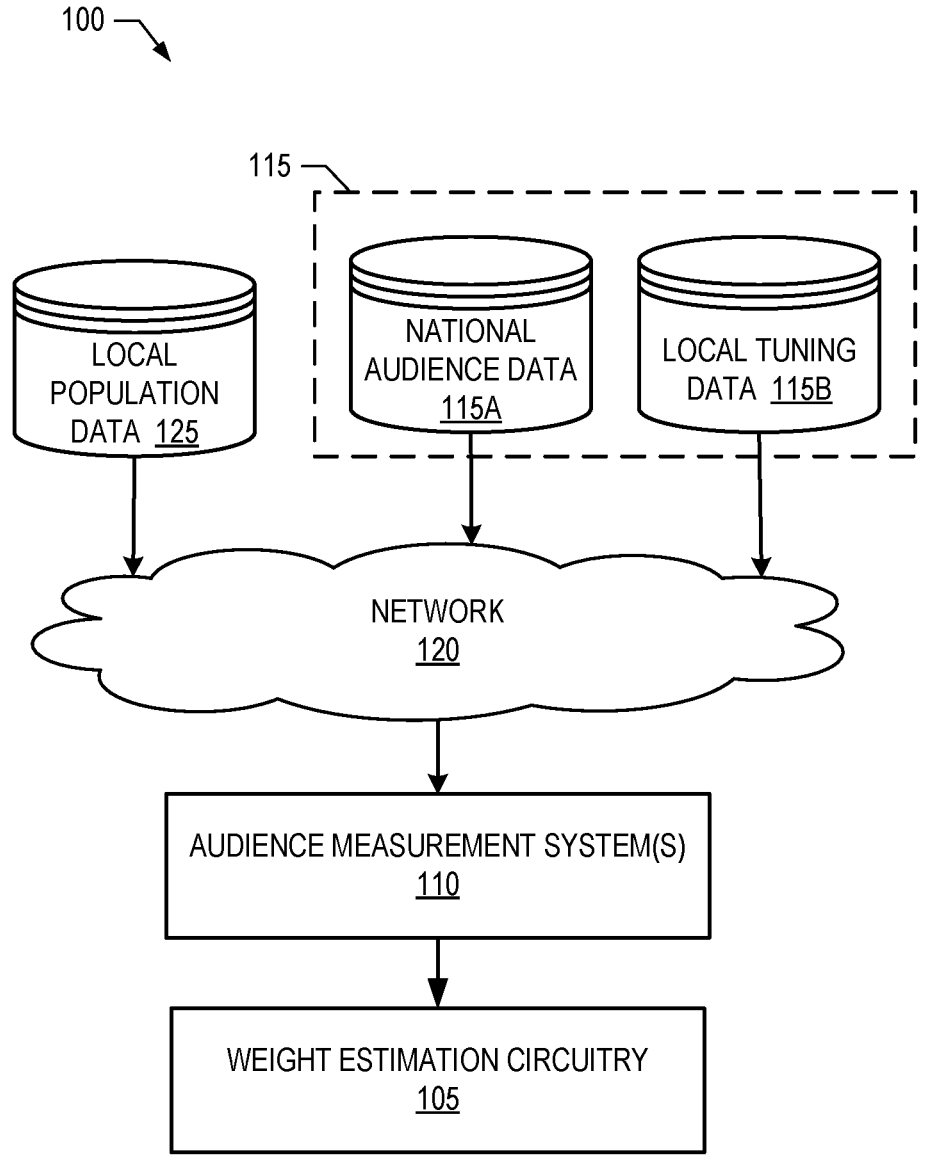
FIG. 1 illustrates an example audience estimation system to estimate, form, compute and/or otherwise generate audience measurement metrics characterizing exposure to media content nationally and/or in one or more local markets.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Examples disclosed herein sample data from census data to allow clients to estimate reach in real time for a variety of cutbacks and time periods without a full unification process. The full unification process is a process that combines and/or otherwise unifies media measurement across platforms for a particular media campaign and/or for a particular client. The full unification process includes identifying unified homes (e.g., household in a unified sample) and reweighting in response to a request from a client. Reweighting in real time for every client request is not computationally feasible because there are tens of millions of homes in the census data samples. Therefore, examples disclosed herein achieve an accurate weight without the lengthy reweighting process. A potential challenge associated with conventional unification methods is that they take a sample of census data, identify certain homes that meet different criteria, and then send the homes through a reweighting process. This can be a challenge because the reweighting process can include several (e.g., at least thirty) controls (e.g., factors, criteria, steps, etc.) and, thus, cause a calculation of the final weight to be slow.

Examples disclosed herein implement a unified mean approach that averages pre-calculated intab weights over a time period to determine the final weight, rather than calculating the final weight using the conventional process. The unified mean approach includes averaging pre-calculated intab weights (e.g., post stratification weights) of a selected time period for unified intab entities (e.g., persons or households), normalizing the weights to a universe estimate to ensure the sum of weights for all entities in the sample adds up to the universe estimate, and using the averaged, normalized weight as a final weight in audience measurement. The intab weights are pre-determined weights, where one weight for a single person could be 100 (or some other value) to represent 100 (or some other number of) people in the population depending on sample sizes, etc. Examples disclosed herein allow for a single weight for each entity across a selected time period to be used in measurement methodologies (e.g., measuring reach). A goal is to come up with a single weight that will represent a panelist, a non-panelist, and/or a household (e.g., an entity) over a period of time, rather than just one day. For example, the unified mean approach determines a weight for an entity that, for example, covers ten days. In such an example, if the entity is a person, examples disclosed herein analyze the intab weights for that person over the ten day period, average the weights together, and use the averaged weight as the weight of that person. Examples disclosed herein average the weights of the person because, depending on the day, that particular person could be associated with a different weight. There are many different factors used during the post stratification process of determining the intab weights for an entity on a particular day, and examples disclosed herein determine one weight that accurately represents an entire time period.

In some examples, "intab" and "panel status" are used interchangeably and refer to the households and/or persons supplying usable information for the selected characteristic and/or demographic break for the geography. For example, intab (or panel status) is the daily cooperating part of the sample, on which the rating published for that day is based. In some examples, there are households and/or persons who are not part of a sample for a particular day and/or a particular segment (e.g., are not intab) due to a measuring device (e.g., a meter) not working and/or any other reason that tuning data could not be collected for that particular household and/or person. In some examples, the segment is a segment of time, a time segment, a portion of time, a time duration, and/or any portion of a time period. As used herein, "post stratification weight(s)," "person weight(s)," "household weight(s)," and "adaptable weight(s)" are used interchangeably and refer to a weight that is applied to an entity on a particular day and/or time segment based on how many people or households the entity represents for that day and/or time segment.

In some examples, "reach" refers to an unduplicated percentage of households and/or persons that watched a program at least once. For example, if a person watches a program in the morning, and rewatches part of the program in the afternoon because they, for example, fell asleep and missed the portion of the program in the morning, then that person would still contribute just once to the reach of the program, not twice. In some examples, reach is determined by a sum of unified weights of unique persons or households exposed to media divided by a sum of unified weights of all persons or households in the unified sample.

In some examples, a "universe estimate" refers to the total number of households or persons within a designated characteristic. In some examples, a "unified sample" refers to whether or not an entity (e.g., a person or a household) should be included in the weighting process disclosed herein. As used herein, an "entity" corresponds to either a person, such as a panelist, or a household. As used herein, a "unified entity" corresponds to an entity in the unified sample. Any type of process could be used for determining the unified sample. The unification sample selection strategy can be flexible. As used herein, a "weighted unified entity" is an entity in the unified sample that has been weighted by examples disclosed herein. As used herein, a "unified weight" is a final weight to apply to the unified entity.

FIG. 1 illustrates an example audience estimation system 100 to estimate, form, compute and/or otherwise generate audience measurement metrics characterizing exposure to media content nationally or in one or more local markets. The media content for which audience measurement metrics are to be determined can correspond to any type of media content, such as television, cable and/or satellite broadcast programming, video-on-demand programming, radio broadcast programming, online/streaming media content, etc. Any number and/or type(s) of audience measurement system(s) 110 can be used to collect, measure and/or otherwise obtain example data 115 representing audiences of media content. The audience measurement system(s) 110 can obtain the audience measurement data via, for example, people meters operating in statistically-selected households, set-top boxes and/or other media devices (e.g., such as digital video recorders, personal computers, tablet computer, smartphones, etc.) capable of monitoring and returning monitored data for media content presentations, etc. In some examples, the audience measurement system(s) 110, as well as the audience estimation system 100, are used by advertisers and/or content providers to measure and/or establish with scientific and/or verifiable accuracy the reach of their advertising campaigns and/or media content.

In some examples, the audience measurement system(s) 110 determines adaptable (e.g., intab, post stratification, etc.) weights for an entity on a day-to-day basis and/or a time segment-to-time segment basis. In some examples, the audience measurement system(s) 110 utilize factors such as sample size, target demographic characteristics, etc., to determine an adaptable weight to apply to an entity on a particular day and/or time segment. In some examples, the factors are criteria selected by clients (e.g., advertisers, etc.) based on specific preferences. The example audience measurement system(s) 110 store the entity and its associated weight in memory (e.g., local memory, volatile memory, non-volatile memory, cache, random-access memory, etc.). In some examples, the audience measurement system(s) 110 store the weighted entities in memory accessible by the weight estimation circuitry 105.

As illustrated in FIG. 1, the example audience measurement system(s) 110 obtain, via an example network 120, the example data 115 representative of audiences of media content during one or more survey time periods. The example data 115 of FIG. 1 includes national audience measurement data 115A collected and/or obtained from, for example, people meters and/or other techniques for measuring a national audience of media content, and local tuning data 115B collected and/or obtained from, for example, return path data provided by cable and/or satellite set-top boxes (STBs) and/or other media devices. In the illustrated example of FIG. 1, the national audience data 115 is assumed to include audience demographic information and to characterize person-level exposure to media content. For example, the national audience data 115 may include age and gender level data associated with a person. In some examples, the national audience data 115 includes both panel data and census data. In contrast, the local tuning data 115B is assumed to not include audience demographic information and to characterize household-level (or, more specifically, device-level or STB-level) exposure to media content. In some examples, the local tuning data 115B includes data from panel households or household data from the census data. The example data 115, 115A and 115B can be implemented by any number and/or type(s) of data structure(s), table(s), list(s) and/or record(s). The data 115, 115A and 115B can be stored on any number and/or type(s) of volatile and/or non-volatile memory(ies), memory device(s) and/or storage device(s).

To provide information representing the population of local markets, the example local market audience estimation system 100 of FIG. 1 includes local population data 125 (also referred to as local universe estimates 125). Local markets are also referred to as designated market areas (DMAs). DMAs and/or local markets are defined for television audience measurement in the United States, ranging in size from several million households (e.g., New York, NY) to a few thousand households (e.g., Zanesville, OH). For economic reasons, advertisers who desire local market audience measurement data may rely on local audience measurement data having smaller sample sizes than national-level audience measurement data.

The example local population data 125 represents the demographics of local markets and can be obtained from any source or combination of sources providing demographic information for the local population(s) for which audience estimation is to be performed. The example local population data 125 can be implemented by any number and/or type(s) of data structure(s), table(s), list(s) and/or record(s). The local population data 125 can be stored on any number and/or type(s) of volatile and/or non-volatile memory(ies), memory device(s) and/or storage device(s).

The example audience estimation system 100 includes the example weight estimation circuitry 105 to determine a final weight to apply to a unified entity. For example, the weight estimation circuitry 105 determines a single weight that will represent a panelist, a non-panelist, and/or a household (e.g., an entity) over a period of time, rather than just one day. The example weight estimation circuitry 105 obtains one or more weighted entities, over a period of time, from the example audience measurement system(s) 110 and determines a final weight to apply to an entity for a selected time period (e.g., one day, 10 days, 15 days, 36 hours, 40 hours, etc.). In some examples, the audience measurement system(s) 110 utilize(s) this final weight to determine an estimated reach in real time. For example, the audience measurement system(s) 110 may obtain a unified mean weight (e.g., a final weight for a specified time period) for an entity from the weight estimation circuitry 105 and apply (e.g., multiply) that weight to the entity to determine a reach for a corresponding media program, media station, etc. The example weight estimation circuitry 105 is described in further detail below in connection with FIG. 2.

Figure 2:
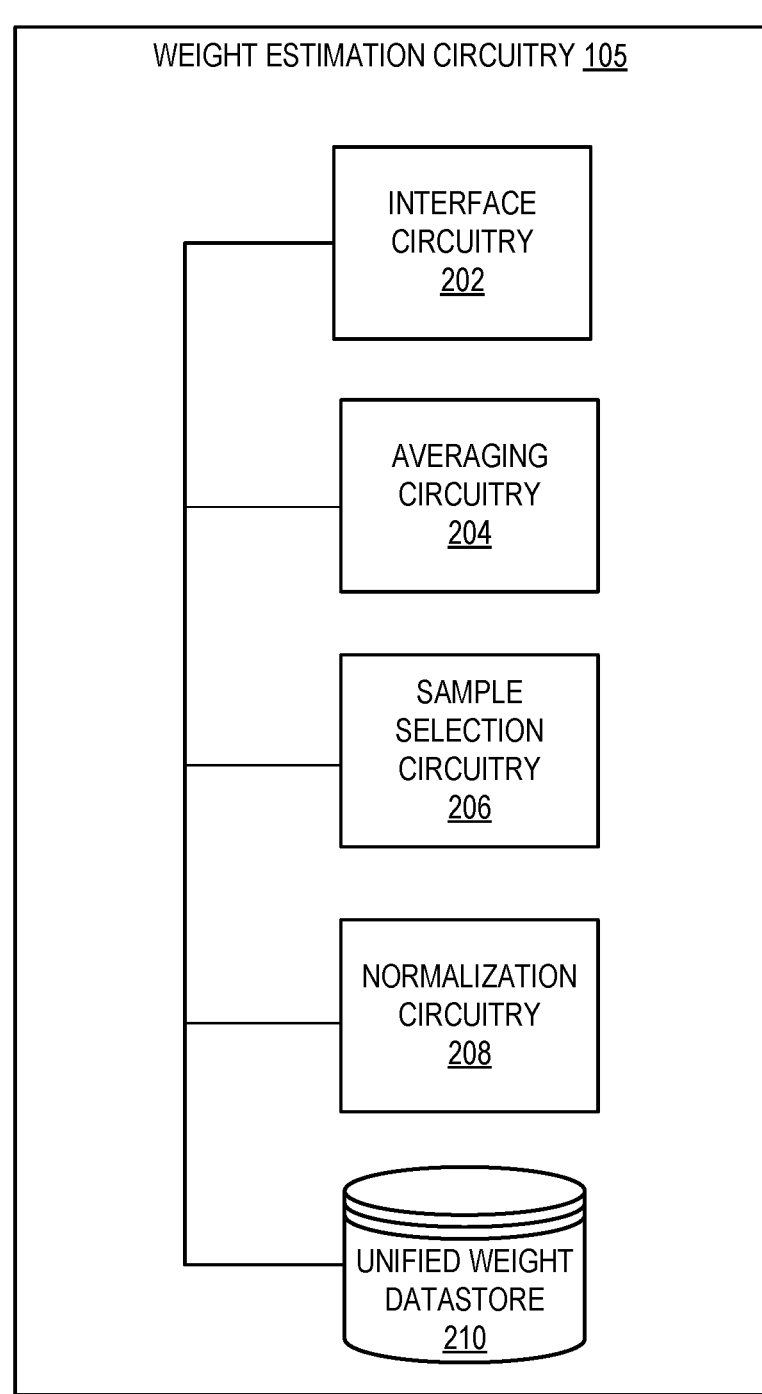
FIG. 2 is a block diagram of an example weight estimation circuitry included in the example audience estimation system of FIG. 1 to determine an average weight for a unified sample.

FIG. 2 is a block diagram of the example weight estimation circuitry 105 of FIG. 1, which is to determine weights of unified entities (e.g., persons or households). The weight estimation circuitry 105 of FIGS. 1 and 2 may be instantiated (e.g., creating an instance of, bring into being for any length of time, materialize, implement, etc.) by processor circuitry such as a central processing unit executing instructions. Additionally or alternatively, the weight estimation circuitry 105 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIGS. 1 and 2 may, thus, be instantiated at the same or different times. Some or all of the circuitry may be instantiated, for example, in one or more threads executing concurrently on hardware and/or in series on hardware. Moreover, in some examples, some or all of the circuitry of FIGS. 1 and 2 may be implemented by microprocessor circuitry executing instructions to implement one or more virtual machines and/or containers.

The example weight estimation circuitry 105 includes example interface circuitry 202, example averaging circuitry 204, example sample selection circuitry 206, example normalization circuitry 208, and an example unified weight datastore 210. In some examples, the interface circuitry 202 is instantiated by processor circuitry executing interface instructions and/or configured to perform operations such as those represented by the flowchart of FIG. 4. In some examples, the averaging circuitry 204 is instantiated by processor circuitry executing averaging instructions and/or configured to perform operations such as those represented by the flowchart of FIG. 4. In some examples, the sample selection circuitry 206 is instantiated by processor circuitry executing sample selection instructions and/or configured to perform operations such as those represented by the flowchart of FIG. 4. In some examples, the normalization circuitry 208 is instantiated by processor circuitry executing normalization instructions and/or configured to perform operations such as those represented by the flowchart of FIG. 4.

In FIG. 2, the example interface circuitry 202 obtains person and/or household identification data, day information, adaptable weights (e.g., intab weight, post stratification weight, and/or person or household weight corresponding to that day information), panel statuses (e.g., intab statuses) of the entity that correspond to respective ones of the time segments in the period of time, etc. In some examples, the interface circuitry 202 obtains this information from a media measurement entity (e.g., the audience measurement system(s) 110 of FIG. 1) that executes and/or implements a daily ratings process. In some examples, the person and/or household identification data is the national audience measurement data 115A of FIG. 1 and/or the local tuning data 115B of FIG. 1. The information obtained by the interface circuitry 202 is described in further detail below in connection with FIG. 3.

In some examples, the weight estimation circuitry 105 includes means for obtaining audience measurement data. For example, the means for obtaining audience measurement data may be implemented by interface circuitry 202. In some examples, the interface circuitry 202 may be instantiated by processor circuitry such as the example processor circuitry 512 of FIG. 5. For instance, the interface circuitry 202 may be instantiated by the example microprocessor 600 of FIG. 6 executing machine executable instructions such as those implemented by at least blocks 402, 410 of FIG. 4. In some examples, the interface circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the interface circuitry 202 may be instantiated by any other combination of hardware, software, and/or firmware. For example, the interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example averaging circuitry 204 is to average together the adaptable weights (e.g., intab weights, post stratification, etc.) for a particular time period. For example, the averaging circuitry 204 averages the adaptable weights, associated with an entity that is intab, based on a given time period (e.g., for 10 days). The average of the adaptable weights for the time period may be used as a unified weight for the person or household for that time period. In some examples, the averaging circuitry 204 averages the adaptable weights because a particular person, depending on the day and/or time segment, could be associated with a different weight for that day and/or time segment. Therefore, it is beneficial to determine one weight (e.g., a unified weight) to represent that entire time period. For example, the averaging circuitry 204 may obtain a first weight (e.g., a first adaptable weight) on a first day (e.g., a first time segment) for a first person, a second weight (e.g., a second adaptable weight) on a second day (e.g., a second time segment) for the first person, and a third weight (e.g., a third adaptable weight) on a third day (e.g., a third time segment) for the first person, where the first person is intab on the first, second, and third days. The example averaging circuitry 204 takes the sum of the first weight, second weight, and third weight and divides that sum by the number of days (e.g., three days) and/or time segments to determine the average weight.

In some examples, the weight estimation circuitry 105 includes means for averaging adaptable weights for each day and/or time segment in a time period. For example, the means for averaging adaptable weights for each day and/or segment in a time period may be implemented by averaging circuitry 204. In some examples, the averaging circuitry 204 may be instantiated by processor circuitry such as the example processor circuitry 500 of FIG. 5. For instance, the averaging circuitry 204 may be instantiated by the example microprocessor 600 of FIG. 6 executing machine executable instructions such as those implemented by at least block 404 of FIG. 4. In some examples, the averaging circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the averaging circuitry 204 may be instantiated by any other combination of hardware, software, and/or firmware. For example, the averaging circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example sample selection circuitry 206 is to identify a unified sample (e.g., entities included in the weighting process). For example, the sample selection circuitry 206 may apply one or more rules to the entity (e.g., person or household) to determine if the person or household should be included in the sample, the rule based on whether the panel statuses indicated the entity met one or more requirements for inclusion in a panel for a specified percentage of time from a start of the period of time through the particular time segment of the period of time. An example rule may be that the person or household has to be intab for at least 75% of the time period to be counted in the unified sample. For such an example, over a ten day time period, a person has to be intab for eight days in order to be included in the unified sample. Any type of rule can be applied to determine and/or identify the unified sample. The example sample selection circuitry 206 assigns a unified weight of zero to the person or household if they are determined to not be in the unified sample for a given day and/or time segment. In some examples, the sample selection circuitry 206 may not specify what entity can be included in the sample. For example, a client (e.g., an advertiser) may not specify requirements for the unified sample. In such an example, the sample selection circuitry 206 selects all the unified weights for all the days and/or time segments of the given time period.

In some examples, the weight estimation circuitry 105 includes means for identifying whether the entity is included in a unified sample for a time period. For example, the means for identifying whether the entity is included in a unified sample for a time period may be implemented by sample selection circuitry 206. In some examples, the sample selection circuitry 206 may be instantiated by processor circuitry such as the example processor circuitry 500 of FIG. 5. For instance, the sample selection circuitry 206 may be instantiated by the example microprocessor 600 of FIG. 6 executing machine executable instructions such as those implemented by at least blocks 406, 408 of FIG. 4. In some examples, the sample selection circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the sample selection circuitry 206 may be instantiated by any other combination of hardware, software, and/or firmware. For example, the sample selection circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example normalization circuitry 208 is to normalize the unified weights of the entities (e.g., persons, households, etc.) in the unified sample to one or more universe estimates to determine normalized unified weights. In some examples, the universe estimate is an age-gender universe estimate. The normalization circuitry 208 normalizes the unified weights of the unified sample to the age-gender universe when the unified sample corresponds to individual persons. In some examples, the normalization circuitry 208 normalizes the unified weights of the unified sample to a different type of universe estimate when the unified sample corresponds to households. In some examples, the normalization circuitry 208 obtains local universe estimates from local population data (e.g., local population data 125 of FIG. 1). In such an example, the normalization circuitry 208 normalizes a unified weight to the population of the DMA. For example, if a client desires to obtain audience measurement data representative of a local market (e.g., a specific city), then the normalization circuitry 208 utilizes a respective local universe estimate to normalize the unified weight.

The normalization circuitry 208 normalizes to the universe estimate using normalization factors (e.g., take the sum of the unified weights of every person in the sample, then divide that number by the universe estimate to determine a normalization factor to apply to the unified weights to form the normalized unified weights). In some examples, the normalization factors correspond to universe demographic buckets. For example, universe demographic buckets may be built to categorize entities in the unified sample. Example demographic buckets include males ages 10-12, females ages 10-12, females ages 20-22, etc. In some examples, each of these demographic buckets includes a universe estimate associated with it. By summing the adaptable weights of the entities in each of the buckets and dividing by the universe estimate of that bucket, the normalization circuitry 208 can determine if the unified weights are overestimated or underestimated, and then the normalization circuitry 208 can adjust the unified weights up or down to get in line with the universe estimate.

In some examples, the normalization circuitry 208 provides the normalized unified weight to the audience measurement system(s) 110 to determine an estimated reach. In some examples, the audience measurement system(s) 110 utilize(s) the normalized unified weight to determine an estimated reach, for a given advertising campaign, for a particular client, for a media program, etc., in substantially real time. In some examples, the estimated reach for an advertising campaign, a media program, a media station, etc., is a reach that the advertising campaign, a media program, a media station, etc., had over a period of time. Therefore, the example audience measurement system(s) 110 use the normalized unified weight(s) to determine that reach.

In some examples, the weight estimation circuitry 105 includes means for normalizing unified weights of all entities to a universe estimate. For example, the means for normalizing unified weights of all entities to a universe estimate may be implemented by normalization circuitry 208. In some examples, the normalization circuitry 208 may be instantiated by processor circuitry such as the example processor circuitry 500 of FIG. 5. For instance, the normalization circuitry 208 may be instantiated by the example microprocessor 600 of FIG. 6 executing machine executable instructions such as those implemented by at least block 412 of FIG. 4. In some examples, the normalization circuitry 208 may be instantiated by hardware logic circuitry, which may be implemented by an ASIC, XPU, or the FPGA circuitry 700 of FIG. 7 structured to perform operations corresponding to the machine readable instructions. Additionally or alternatively, the normalization circuitry 208 may be instantiated by any other combination of hardware, software, and/or firmware. For example, the normalization circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In FIG. 2, the example unified weight datastore 210 stores unified weights, sample selection data, and entity data. For example, the unified weight datastore 210 stores adaptable weights and corresponding entity data (e.g., person identification and/or household identification) provided by an audience measurement entity (e.g., audience measurement system(s) 110), unified weights, and sample selection criteria (e.g., policies, rules, etc., corresponding to what can be included in the unified sample). In some examples, the unified weight datastore 210 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The unified weight datastore 210 can additionally or alternatively be implemented by one or more double data rate (DDR) memories, such as DDR, DDR2, DDR3, DDR4, mobile DDR (mDDR), etc. The unified weight datastore 210 can additionally or alternatively be implemented by one or more mass storage devices such as hard disk drive(s), compact disk drive(s), digital versatile disk drive(s), solid-state disk drive(s), etc. While in the illustrated example the unified weight datastore 210 is illustrated as a single datastore, the unified weight datastore 210 can be implemented by any number and/or type(s) of datastores. Furthermore, the data stored in the unified weight datastore 210 can be in any data format such as, for example, binary data, comma delimited data, tab delimited data, structured query language (SQL) structures, etc.

Figure 3:
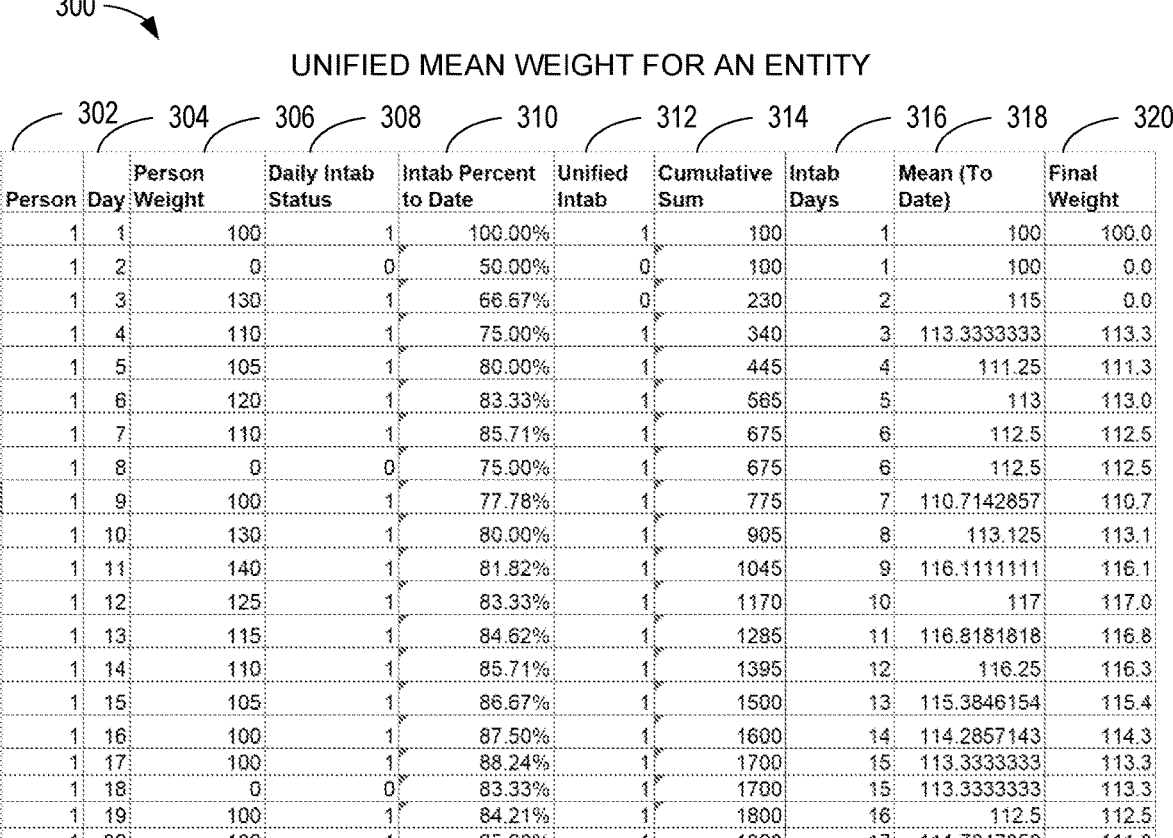
FIG. 3 is an example table illustrating the unified mean weight of an entity.

FIG. 3 is an example table 300 illustrating calculation of the unified mean weight of an entity. The example table 300 includes an example entity column 302, an example time column 304, an example entity weight 306, an example daily intab column 308, an example intab percent to date column 310, am example unified intab column 312, an example cumulative sum column 314, an example intab days column 316, a, example mean column 318, and an example unified weight column 320.

In FIG. 3, the entity column 302 identifies an entity whose weight for a period of time is being determined. In some examples, an entity is a household, a panelist, or any non-panelist having corresponding ratings data from census data (e.g., national audience measurement data 115A and local tuning data 115B). In FIG. 3, the entity column 302 identifies that person 1 is being measured.

In FIG. 3, the time column 304 is indicative of a day out of a period of days for which an entity's unified weight is being determined. The period of days corresponds to a period of time represented by the unified weight. In some examples, the time column 304 is indicative of a segment of the period of time represented by the unified weight.

In FIG. 3, the entity weight 306 is indicative of a post stratification weight of the entity for that day and/or time segment. For example, on day one, the single entity might represent 100 people in a total population, and therefore the entity's post stratification weight is 100. On day two, however, the single entity might represent 130 people in the total population, and therefore the entity's post stratification weight is 130. As used herein, the entity weight 306 is the adaptable weight.

In FIG. 3, the daily intab status 308 is indicative of whether the entity was intab (e.g., whether the entity met one or more requirements for inclusion in a panel) for the day and/or for the time segment. For example, the daily intab status 308 keeps track of whether the media measurement data was collected for the entity that day. In this example, a "1" indicates that the entity is intab for that day, and a "0" indicates that the entity was not intab for that day. In some examples, the intab status 308 is a panel status of the entity that corresponds to a respective one of the time segments of the period of time.

In FIG. 3, the intab percent to date column 310 is indicative of a percentage that the entity was intab for the period of time selected (e.g., 20 days). For example, on day one, person 1 was intab and, thus, was intab for 100 percent of the time period. However, on day two, person 1 was not intab and, thus, was intab only for 50 percent of the time period (e.g., out of two days, person 1 was only intab for one of those days). In some examples, the intab percent to date column 310 is utilized by the sample selection circuitry 206 to determine what entities should be included in the sample for a given period of time and, thus, for which entities the unified weights should be computed. For example, the intab percent to date column 310 is used by the unified intab column 312 to determine whether an entity should be included in the unified sample.

In FIG. 3, the unified intab column 312 is indicative of whether the entity is included in the unified sample. For example, the sample selection circuitry 206 applies one or more rules to the percentage in the intab percent to date column 310 to determine whether the entity should be assigned a unified intab weight of zero or a unified intab weight of one. In this example, a unified intab weight of zero indicates that the entity was not in the unified sample for that particular day and/or the particular time segment. For example, the rule may be that the entity has to be intab for 75% of the total time period. On day 2, person 1 was intab for only 50% of the two days. Therefore, the example unified tab column 312 indicates that person 1 on day 2 does not satisfy the sample selection rule.

In FIG. 3, the cumulative sum column 314 is indicative of a sum of the entity's adaptable weights over a time period, excluding the adaptable weights corresponding to when the entity was not intab for that day and/or time segment. For example, the sum of adaptable weights over a period of 20 days is determined for person 1, but an adaptable weight corresponding to a particular day and/or time segment of person 1 will not be included in the sum if person 1 was not in the intab that day.

In FIG. 3, the intab days column 316 is indicative of a total number of days (or time segments), out of the time period, that the entity was met one or more requirements for inclusion in the panel (e.g., was intab). For example, on day two, person 1 was only intab for one day out of the two days. However, on day three, person 1 was intab for two days out of the three days.

In FIG. 3, the mean column 318 is indicative of an average value of the cumulative sum of the adaptable weights for the entity. For example, the averaging circuitry 204 determines the average of the cumulative sum of the adaptable weights for the entity by dividing the cumulative sum of the adaptable weights of the cumulative sum column 314 by the total number of days (or time segments), out of the time period, that the entity was intab.

In FIG. 3, the unified weight column 320 is indicative of the unified weights that can be output for the entity for different time periods represented by the different rows of the table. In the illustrated example, row N of the table represents a time period spanning N days beginning with day 1 (corresponding to the first row) up to the Nth row in the table. In the illustrated example, the unified weights for person 1 correspond to the average values of the cumulative sums of the adaptable weights for the person 1 from the preceding column, but with exclusion of those unified weights for time periods in which person 1 was not included in the unified sample. For example, the normalization circuitry 208 normalizes the value in the mean column 318 with a universe estimate value to get the final unified weight in column 320. In the illustrated example of FIG. 3, the normalization factor is 1. However, the normalization factor can be any number and can be determined in any manner based on the universe estimate corresponding to that entity. In some examples, if a selected day or a selected time segment in the time period does not include an intab status satisfying a sample selection criteria (e.g., represented by the unified intab column 312), then the final (e.g., unified) weight of that selected day or time segment will be zero (see e.g., see the entries of column 320 corresponding to days 2 and 3 in table 300).

While an example manner of implementing the weight estimation circuitry 105 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example averaging circuitry 204, the example sample selection circuitry 206, the example normalization circuitry 208, the example unified weight datastore 210, and/or, more generally, the example weight estimation circuitry 105 of FIG. 2, may be implemented by hardware alone or by hardware in combination with software and/or firmware. Thus, for example, any of the example interface circuitry 202, the example averaging circuitry 204, the example sample selection circuitry 206, the example normalization circuitry 208, and/or, more generally, the example weight estimation circuitry 105, the example unified weight datastore 210 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example weight estimation circuitry 105 of FIG. 1 may include one or more elements, processes, and/or devices in addition to, or instead of, those illustrated in FIG. 2, and/or may include more than one of any or all of the illustrated elements, processes and devices.

Figure 4:
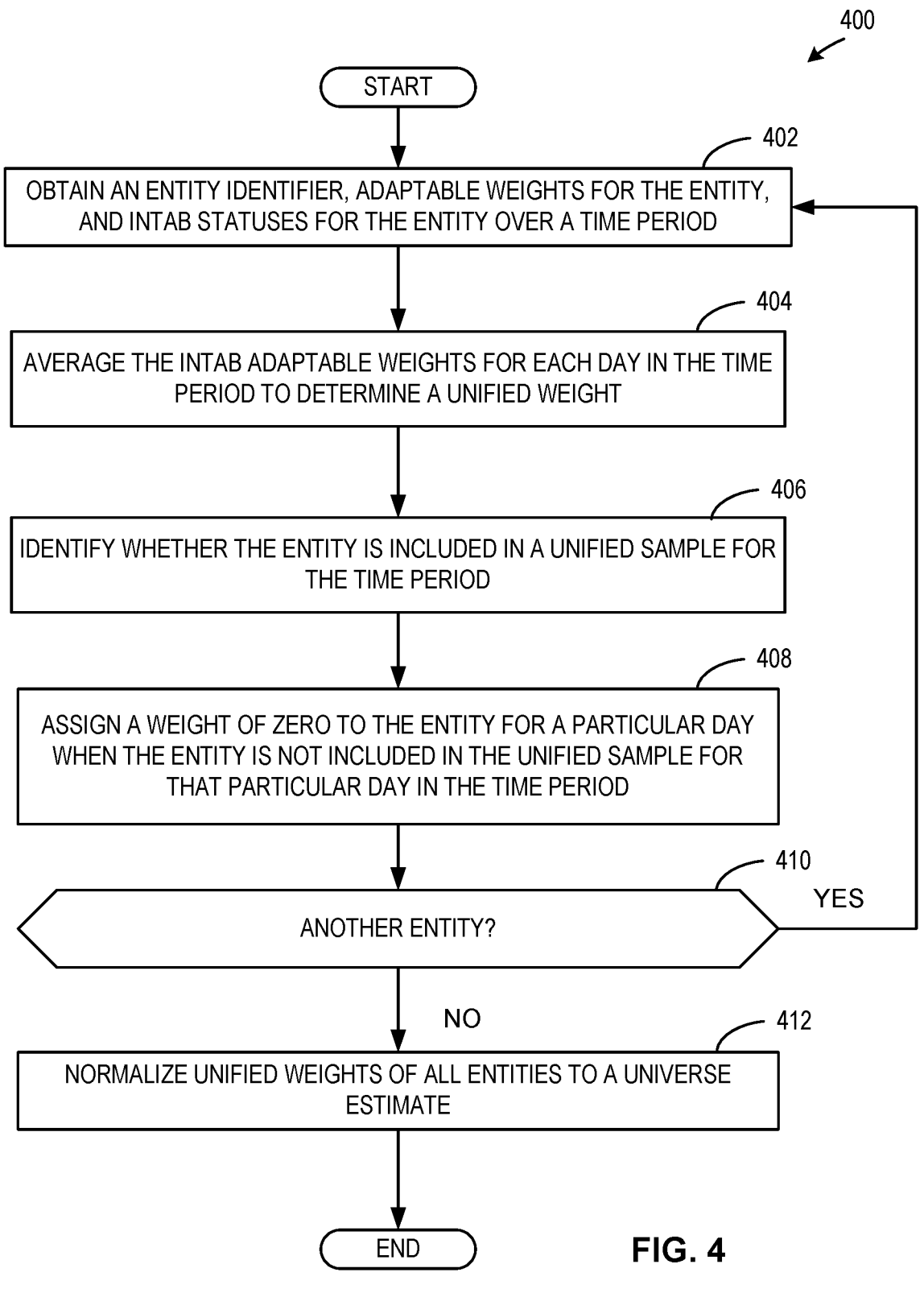
FIG. 4 is a flowchart representative of example machine readable instructions and/or example operations that may be executed by example processor circuitry to implement the weight estimation circuitry of FIGS. 1 and 2.

A flowchart representative of example machine readable instructions, which may be executed to configure processor circuitry to implement the weight estimation circuitry 105 of FIGS. 1 and 2, is shown in FIG. 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example weight estimation circuitry 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to determine a unified weight for an entity in a unified sample such that the unified weight represents a particular time period. The machine readable instructions and/or the operations 400 of FIG. 4 begin at block 402, at which the interface circuitry 202 obtains an entity identifier, adaptable weights for the entity, and panel statuses/intab statutes of the entity that correspond to respective ones of the time segments in the selected time period, etc. For example, the interface circuitry 202 obtains data from an audience measurement entity (e.g., the audience measurement system(s)110 of FIG. 1) corresponding to processed national audience data, processed local tuning data, etc. In some examples, national audience data is processed when the audience measurement entity determines post stratification weights (e.g., adaptable weights) for panel members and/or non-panel members included in the national audience data. In some examples, the national audience data is processed when the audience measurement entity assigns an identifier to the panel members and/or non-panel members in the national audience data, assigns an intab status to the panel members and/or non-panel members, assigns a timestamp and/or day identifier to the panel members and/or non-panel members, etc. In some examples, the audience measurement entity does not assign intab statuses/panel statuses, identifiers, and/or timestamps to the panel members and/or non-panel members. In such an example, the measurement devices (e.g., television meters, people meters, etc.) process the panel members and/or non-panel members prior to sending the data to the audience measurement entity. In some examples, the local tuning data (e.g., local tuning data 115B) is processed in a similar manner as the national audience data (e.g., national audience measurement data 115A).

The example averaging circuitry 204 averages the intab adaptable weights for each day in the time period to determine a unified weight (block 404). For example, the averaging circuitry 204 sums the post stratification weights (e.g., adaptable weights), corresponding to the entity, for each day and/or time segment in the time period that the entity was intab. The averaging circuitry 204 divides the sum of post stratification weights by the total number of days (or time segments) the entity was intab in the time period to get the average and/or mean weight (e.g., the unified weight) of the entity over the time period.

The example sample selection circuitry 206 identifies whether the entity is included in a unified sample for that selected time period (block 406). For example, the sample selection circuitry 206 utilizes the daily panel statuses to determine an intab percent to date and applies one or more rules to the percentage to determine whether the entity should be included in the unified sample for that day or time segment. For example, if the rules indicate that the entity should be included in the sample when the entity has been in tab for 75% of the time period, then the sample selection circuitry 206 compare the percentage to the rule to determine whether the entity, on that day, satisfies the rule.

The example sample selection circuitry 206 assigns a weight of zero to the entity when the entity is not included in the unified sample for the time period (block 408). For example, the sample selection circuitry 206 applies the one or more rules to the percentage to determine whether the percentage satisfies the one or more rules. For example, the rule may be that the entity has to be intab for 75% of the time period. In some examples, if the intab percent to date is less than 75% on a particular day and/or a time segment, then the sample selection circuitry 206 assigns a weight of zero to the entity for that day and/or time segment, instead of using the unified weight.

The example interface circuitry 202 determines if there is another entity (block 410). For example, the interface circuitry 202 determines if there is another person or household to determine an average unified weight over a particular time period for. If the interface circuitry 202 determines there is another entity (e.g., block 410: YES), control returns to block 402.

If the interface circuitry 202 determines there is not another entity (e.g., block 410: NO), the example normalization circuitry 208 normalizes the unified weight of the entities to a universe estimate (block 412). For example, the normalization circuitry 208 compares the averaged weight to a universe estimate average weight to determine if the averaged weight should be adjusted. In some examples, the universe estimate corresponds to a local universe estimate. In some examples, the universe estimate corresponds to a national universe estimate.

The example operations 400 end when the normalization circuitry 208 normalizes the unified weight corresponding to the entity and the selected time period. In some examples, the operations 400 repeats when the interface circuitry 202 obtains an entity identifier with adaptable weights.

Figure 5:
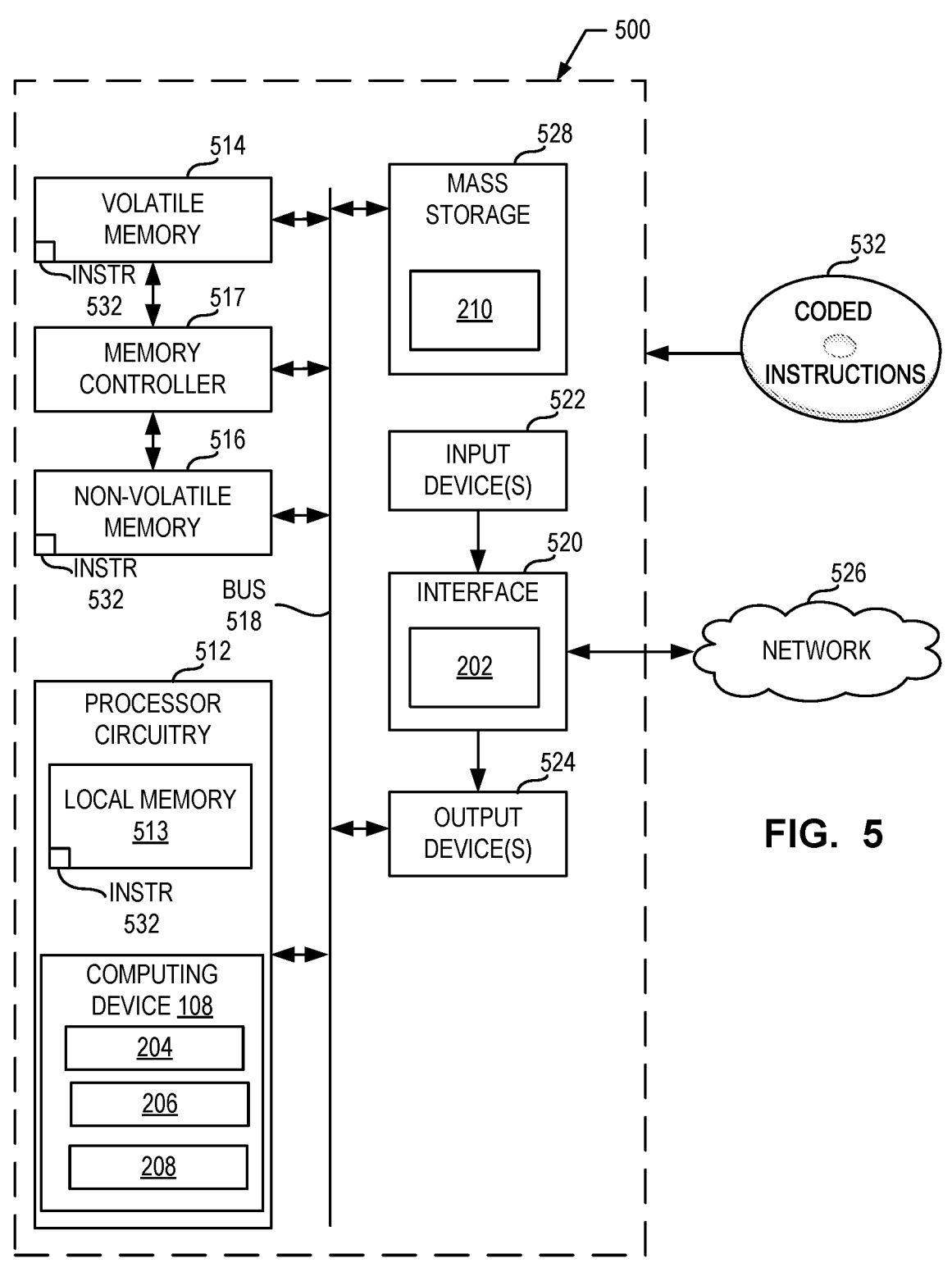
FIG. 5 is a block diagram of an example processing platform including processor circuitry structured to execute the example machine readable instructions and/or the example operations of FIG. 4 to implement the weight estimation circuitry of FIGS. 1 and 2.

FIG. 5 is a block diagram of an example processor platform 500 structured to execute and/or instantiate the machine readable instructions and/or the operations of FIG. 4 to implement the weight estimation circuitry 105 of FIGS. 1 and 2. The processor platform 500 can be, for example, a server, a personal computer, a workstation, a self-learning machine (e.g., a neural network), a mobile device (e.g., a cell phone, a smart phone, a tablet such as an iPad™), an Internet appliance, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example interface circuitry 202, the example averaging circuitry 204, the example sample selection circuitry 206, and the example normalization circuitry 208.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or a printer. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage devices 528 implements the example unified weight datastore 210.

The machine readable instructions 532, which may be implemented by the machine readable instructions of FIG. 4, may be stored in the mass storage device 528, in the volatile memory 514, in the non-volatile memory 516, and/or on a removable non-transitory computer readable storage medium such as a CD or DVD.

Figure 6:
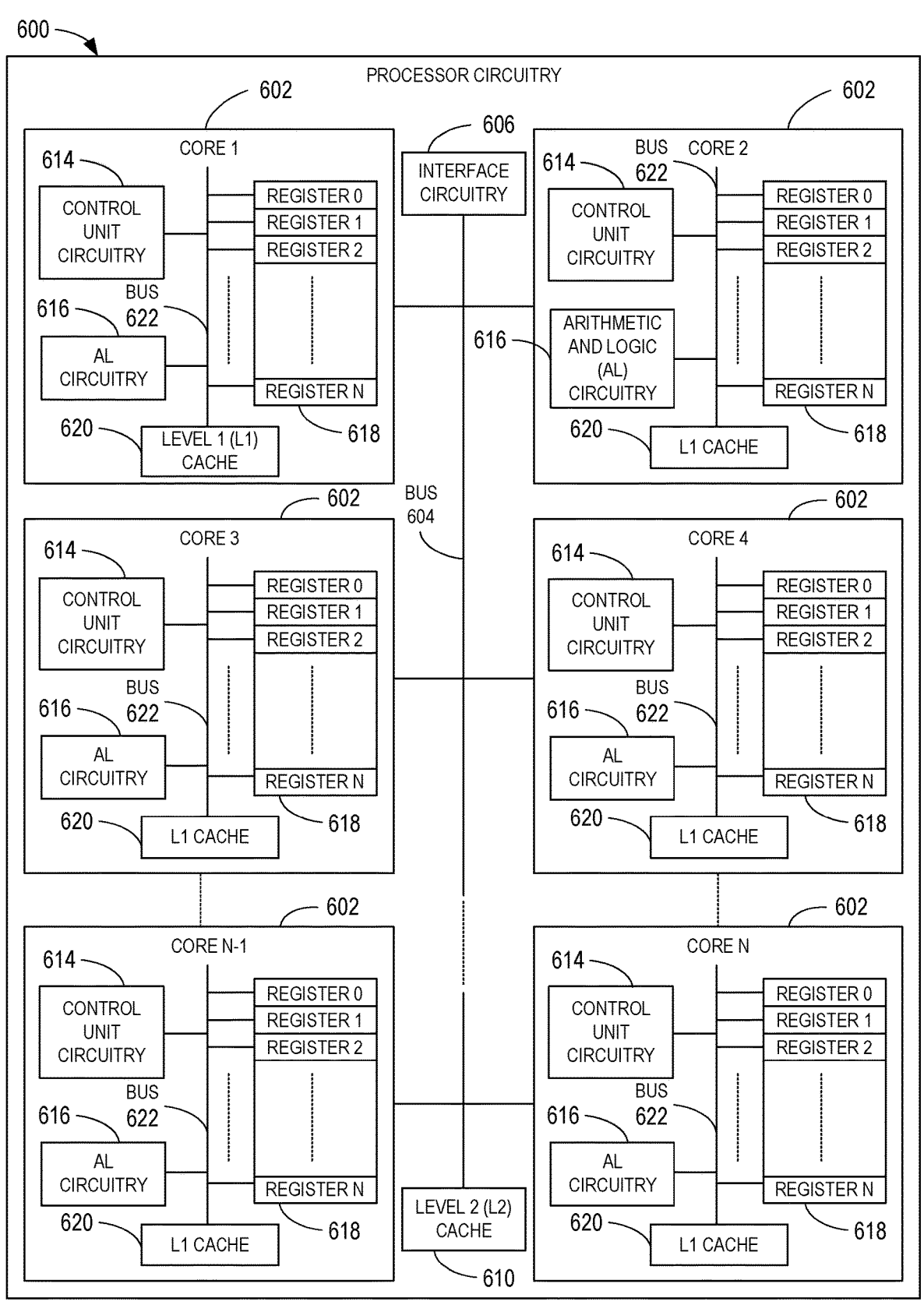
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowchart of FIG. 4 to effectively instantiate the weight estimation circuitry 105 of FIG. 2 as logic circuits to perform the operations corresponding to those machine readable instructions. In some such examples, the weight estimation circuitry of FIG. 2 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the micropro-cessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 3.

The cores 602 may communicate by a first example bus 604. In some examples, the first bus 604 may be imple-mented by a communication bus to effectuate communica-tion associated with one(s) of the cores 602. For example, the first bus 604 may be implemented by at least one of an Inter-Integrated Circuit (I2C) bus, a Serial Peripheral Inter-face (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, float-ing-point unit (FPU) circuitry, etc. The control unit circuitry 614 includes semiconductor-based circuits structured to control (e.g., coordinate) data movement within the corre-sponding core 602. The AL circuitry 616 includes semicon-ductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based opera-tions and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific regis-ter(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be imple-mented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelera-tors may be on-board the processor circuitry, in the same chip package as the processor circuitry and/or in one or more separate packages from the processor circuitry.

Figure 7:
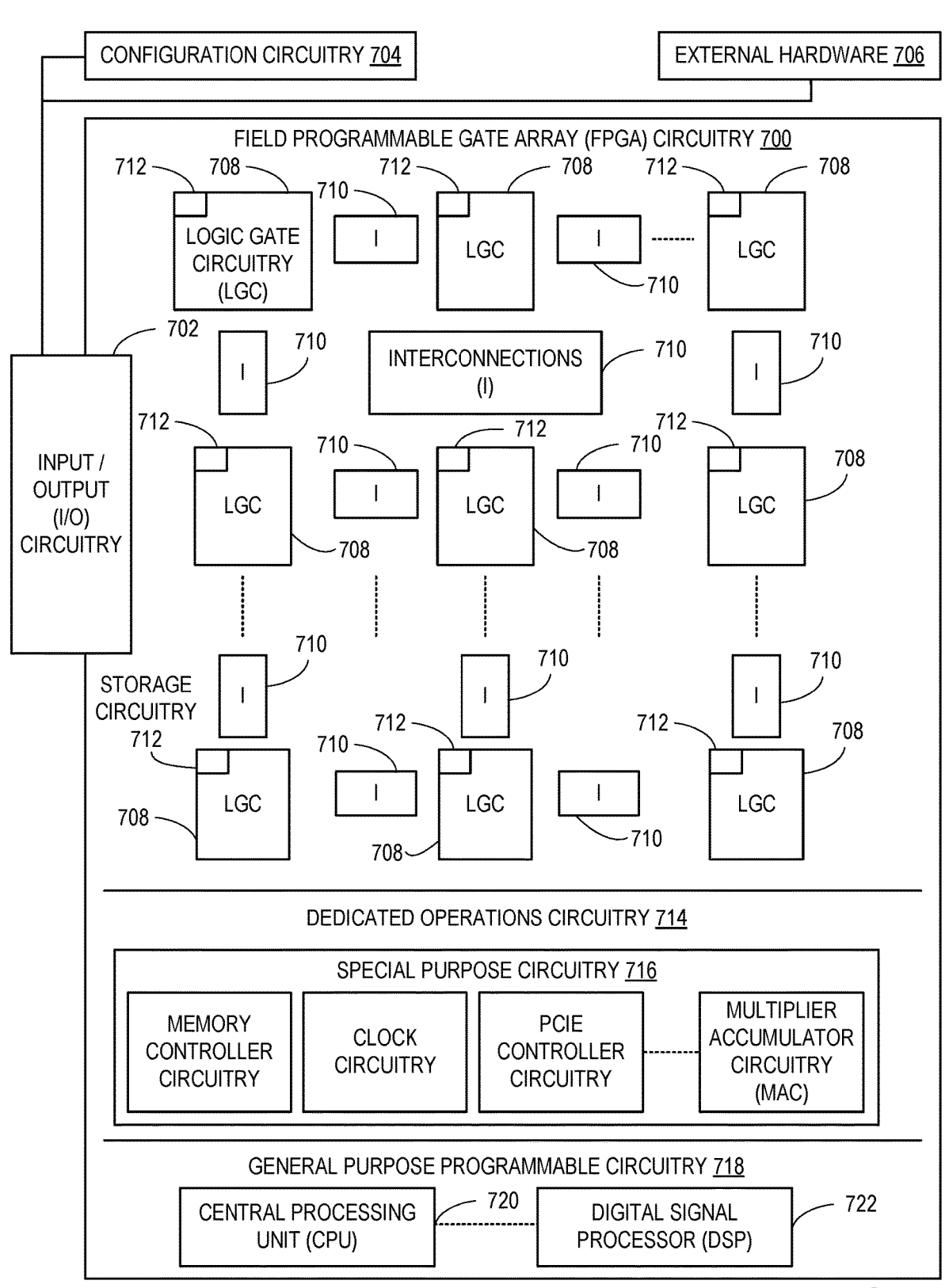
FIG. 7 is a block diagram of another example implementation of the processor circuitry of FIG. 5.

FIG. 7 is a block diagram of another example implemen-tation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hard-ware and, thus, can often execute the operations faster than they could be performed by a general purpose microproces-sor executing the corresponding software.

More specifically, in contrast to the microprocessor 600 of FIG. 6 described above (which is a general purpose device that may be programmed to execute some or all of the machine readable instructions represented by the flowchart of FIG. 3 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowchart of FIG. 3. In particular, the FPGA circuitry 700 may be thought of as an array of logic gates, intercon-nections, and switches. The switches can be programmed to change how the logic gates are interconnected by the inter-connections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowchart of FIG. 3. As such, the FPGA circuitry 700 may be structured to effectively instantiate some or all of the machine readable instructions of the flowchart of FIG. 3 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 3 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIG. 3 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIG. 3 may be executed by one or more of the cores 602 of FIG. 6, a second portion of the machine readable instructions represented by the flowchart of FIG. 3 may be executed by the FPGA circuitry 700 of FIG. 7, and/or a third portion of the machine readable instructions represented by the flowchart of FIG. 3 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
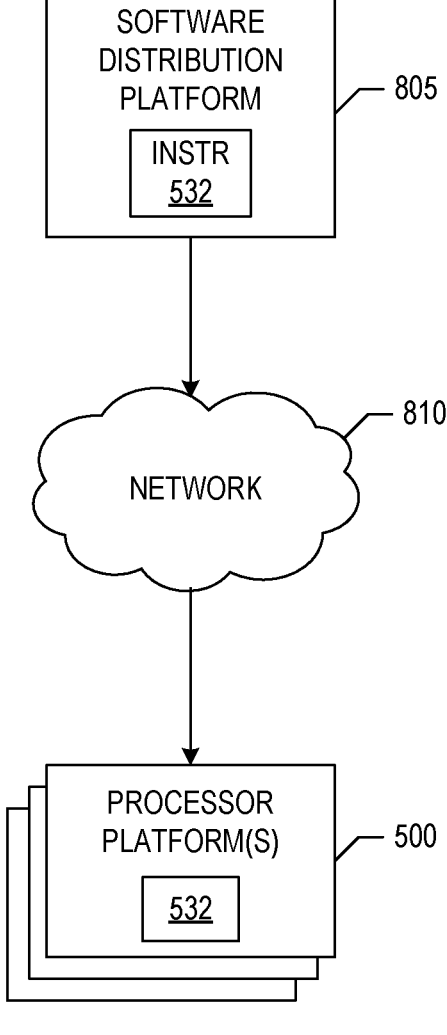
FIG. 8 is a block diagram of an example software distribution platform (e.g., one or more servers) to distribute software (e.g., software corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sublicensing. In the illustrated example, the software distribution platform 805 includes one or more servers and one or more storage devices. The storage devices store the machine readable instructions 532, which may correspond to the example machine readable instructions 400 of FIG. 4, as described above. The one or more servers of the example software distribution platform 805 are in communication with an example network 810, which may correspond to any one or more of the Internet and/or any of the example networks 526 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 400 of FIG. 4, may be downloaded to the example processor platform 500, which is to execute the machine readable instructions 532 to implement the weight estimation circuitry 105. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

Example methods, apparatus, systems, and articles of manufacture to determine unified entity weights for media measurement are disclosed herein. Further examples and combinations thereof include the following:

Example 1 includes an apparatus to comprising at least one memory, machine readable instructions, and processor circuitry to at least one of instantiate or execute the machine readable instructions to obtain entity data associated with an entity over a period of time including a plurality of time segments, the entity data including an entity identifier, adaptable weights of the entity associated respectively with the time segments in the period of time, and panel statuses of the entity that correspond to respective ones of the time segments in the period of time, and average the adaptable weights based on the panel statuses to determine a unified weight of the entity for the period of time.

Example 2 includes the apparatus of example 1, wherein the processor circuitry is to apply a rule to the panel statuses of the entity to determine whether the entity is included in a unified sample for a particular time segment of the period of time, the rule based on whether the panel statuses indicated the entity met one or more requirements for inclusion in a panel for a specified percentage of time from a start of the period of time through the particular time segment of the period of time.

Example 3 includes the apparatus of example 2, wherein the processor circuitry is to assign a weight of zero to the entity for the particular time segment of the period of time in response to a determination that the entity is not to be included in the unified sample for the particular time segment of the period of time.

Example 4 includes the apparatus of example 1, wherein the processor circuitry is to normalize the unified weight of the entity to a universe estimate, and the universe estimate is at least one of a local universe estimate or a national universe estimate.

Example 5 includes the apparatus of example 1, wherein the entity is at least one of a panel member, a non-panel member, or a household.

Example 6 includes the apparatus of example 1, wherein the processor circuitry is to normalize the unified weight of the entity to a universe estimate, the universe estimate associated with universe demographic buckets, the universe demographic buckets to categorize entities in a unified sample based on at least one of age or gender.

Example 7 includes the apparatus of example 1, wherein the adaptable weights are weights applied to the entity based on how many individuals in a population the entity is to represent, and the adaptable weights for the entity are permitted to vary over different time segments in the period of time.

Example 8 includes the apparatus of example 1, wherein the processor circuitry is to provide the unified weight to an audience measurement system, the audience measurement system to determine an estimated reach based on the unified weight.

Example 9 includes a non-transitory machine readable storage medium comprising instructions that, when executed, cause processor circuitry to at least obtain entity data associated with an entity over a period of time including a plurality of time segments, the entity data including an entity identifier, adaptable weights of the entity associated respectively with the time segments in the period of time, and panel statuses of the entity that correspond to respective ones of the time segments in the period of time, and average the adaptable weights based on the panel statuses to determine a unified weight of the entity for the period of time.

Example 10 includes the non-transitory computer-readable medium of example 9, wherein the instructions, when executed, cause the machine to apply a rule to the panel statuses of the entity to determine whether the entity is included in a unified sample for a particular time segment of the period of time, the rule based on whether the panel statuses indicated the entity met one or more requirements for inclusion in a panel for a specified percentage of time from a start of the period of time through the particular time segment of the period of time.

Example 11 includes the non-transitory computer-readable medium of example 10, wherein the instructions, when executed, cause the machine to assign a weight of zero to the entity for the particular time segment of the period of time in response to a determination that the entity is not to be included in the unified sample for the particular time segment of the period of time.

Example 12 includes the non-transitory computer-readable medium of example 9, wherein the instructions, when executed, cause the machine to normalize the unified weight of the entity to a universe estimate, the universe estimate is at least one of a local universe estimate or a national universe estimate.

Example 13 includes the non-transitory computer-readable medium of example 9, wherein the entity is at least one of a panel member, a non-panel member, or a household.

Example 14 includes the non-transitory computer-readable medium of example 9, wherein the instructions, when executed, cause the machine to normalize the unified weight of the entity to a universe estimate, the universe estimate associated with universe demographic buckets, the universe demographic buckets to categorize entities in a unified sample based on at least one of age or gender.

Example 15 includes the non-transitory computer-readable medium of example 9, wherein the adaptable weights are weights applied to the entity based on how many individuals in a population the entity is to represent, wherein the adaptable weights for the entity are permitted to vary over different time segments in the period of time.

Example 16 includes an apparatus comprising interface circuitry to obtain entity data associated with an entity over a period of time including a plurality of time segments, the entity data including an entity identifier, adaptable weights of the entity associated respectively with the time segments in the period of time, and panel statuses of the entity that correspond to respective ones of the time segments in the period of time, and weight estimation circuitry to average the adaptable weights based in the panel statuses to determine a unified weight of the entity for the period of time.

Example 17 includes the apparatus of example 16, further including sample selection circuitry to apply a rule to the panel statuses of the entity to determine whether the entity is included in a unified sample for a particular time segment of the period of time, the rule based on whether the panel statuses indicated the entity met one or more requirements for inclusion in a panel for a specified percentage of time from a start of the period of time through the particular time segment of the period of time.

Example 18 includes the apparatus of example 17, wherein the sample selection circuitry is to assign a weight of zero to the entity for the particular time segment of the period of time in response to a determination that the entity is not to be included in the unified sample for the particular time segment of the period of time.

Example 19 includes the apparatus of example 16, wherein the entity is at least one of a panel member, a non-panel member, or a household.

Example 20 includes the apparatus of example 16, further including normalization circuitry to normalize the unified weight of the entity to a universe estimate, the universe estimate associated with universe demographic buckets, the universe demographic buckets to categorize entities in a unified sample based on at least one of age or gender.

Example 21 includes the apparatus of example 16, wherein the adaptable weights are weights applied to the entity based on how many individuals in a population the entity is to represent, wherein the adaptable weights for the entity are permitted to vary over different time segments in the period of time.

Example 22 includes the apparatus of example 16, further including normalization circuitry to normalize the unified weight of the entity to a universe estimate, the universe estimate is at least one of a local universe estimate or a national universe estimate.

From the foregoing, it will be appreciated that example systems, methods, apparatus, and articles of manufacture have been disclosed that determine an average weight for each entity across an arbitrary time period to be used in measurement methodologies. Disclosed systems, methods, apparatus, and articles of manufacture improve the efficiency of using a computing device by reducing a computation time to reweight an entity for a unified sample. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An audience measurement computing system comprising:

a semiconductor microprocessor device comprising a plurality of cores, wherein each of the cores is configured to operate independently;

a Field Programmable Gate Array (FPGA) comprising an array of logic gates, a plurality of configurable interconnections, and a storage circuitry, wherein the storage circuitry is distributed among the array of logic gates so as to increase execution speed;

an interface circuitry; and a memory storing instructions that, when executed by the semiconductor microprocessor device and the FPGA cause the audience measurement computing system to perform operations comprising:

obtaining, via one or more network communications, entity data for a plurality of entities by:

obtaining, by a first sub-array of logic gates of the FPGA and via the one or more network communications, audience measurement data from meter devices disposed at a plurality of media exposure measurement locations, storing, by the storage circuitry of the FPGA, a first result of the obtaining of the audience measurement data from meter devices, obtaining, by a second sub-array of logic gates the FPGA and via the one or more network communications, return path data from media devices disposed at the plurality of media exposure measurement locations, and storing, by the storage circuitry of the FPGA, a second result of the obtaining of return path data from the media devices;

wherein each entity of the plurality of entities comprises: a person, or a household representing a media exposure measurement location, and wherein, for each entity of the plurality of entities: i) the entity data represents a period of time comprising a plurality of time segments, and ii) the entity data comprises: an entity identifier for the entity and, for each time segment in the period of time: an adaptable weight of the entity and a panel status of the entity;

determining, at each iteration of a plurality of iterations executed in parallel by the plurality of cores semiconductor microprocessor device, a unified weight for each respective entity of the plurality of entities, comprising, at each iteration:

averaging, by the respective core, the adaptable weights based on the panel statuses to determine the unified weight of the respective entity for the period of time, and outputting, by the plurality of cores the semiconductor microprocessor device and the interface circuitry, the unified weights of the plurality of entities to an external device.

2. The system of claim 1, wherein the operations further comprise:

applying a rule to the panel statuses of the entity to determine whether the entity is included in a unified sample for a particular time segment of the period of time, the rule based on whether the panel statuses indicated the entity met one or more requirements for inclusion in a panel for a specified percentage of time from a start of the period of time through the particular time segment of the period of time.

3. The system of claim 2, wherein the operations further comprise:

assigning a weight of zero to the entity for the particular time segment of the period of time in response to a determination that the entity is not to be included in the unified sample for the particular time segment of the period of time.

4. The system of claim 1, wherein the adaptable weights are weights applied to the entity based on how many individuals in a population the entity is to represent, and the adaptable weights for the entity are permitted to vary over different time segments in the period of time.

5. The system of claim 1, wherein the operations further comprise:

using the unified weights to determine an estimated reach.

6. A non-transitory machine readable storage medium comprising instructions that, when executed by an audience measurement computing system comprising: i) a semiconductor microprocessor device comprising a plurality of cores, wherein each of the cores is configured to operate independently, ii) a Field Programmable Gate Array (FPGA) comprising an array of logic gates, a plurality of configurable interconnections, and a storage circuitry, wherein the storage circuitry is distributed among the array of logic gates so as to increase execution speed, iii) a interface circuitry, and iv) a memory, cause the system to perform operations comprising:

obtaining, via one or more network communications, entity data for a plurality of entities by:

obtaining, by a first sub-array of logic gates of the FPGA and via the one or more network communications, audience measurement data from meter devices disposed at a plurality of media exposure measurement locations, storing, by the storage circuitry of the FPGA, a first result of the obtaining of the audience measurement data from meter devices, obtaining, by the second sub-array of logic gates the FPGA and via the one or more network communications, return path data from media devices disposed at the plurality of media exposure measurement locations, and storing, by the storage circuitry of the FPGA, a second result of the obtaining of return path data from the media devices;

wherein each entity of the plurality of entities comprises: a person, or a household representing a media exposure measurement location, and wherein, for each entity of the plurality of entities: i) the entity data represents a period of time comprising a plurality of time segments, and ii) the entity data comprises: an entity identifier for the entity and, for each time segment in the period of time: an adaptable weight of the entity and a panel status of the entity;

determining, at each iteration of a plurality of iterations executed in parallel by the plurality of cores of the semiconductor microprocessor device, a unified weight for each respective entity of the plurality of entities, comprising, at each iteration:

averaging, by the respective core, the adaptable weights based in the panel statuses to determine the unified weight of the respective entity for the period of time; and outputting, by the plurality of cores of the semiconductor microprocessor device and the interface circuitry, the unified weights of the plurality of entities to an external device.

7. The non-transitory computer readable storage medium of claim 6, wherein the operations further comprise:

applying a rule to the panel statuses of the entity to determine whether the entity is included in a unified sample for a particular time segment of the period of time, the rule based on whether the panel statuses indicated the entity met one or more requirements for inclusion in a panel for a specified percentage of time from a start of the period of time through the particular time segment of the period of time.

8. The non-transitory computer readable storage medium of claim 7, wherein the operations further comprise:

assigning a weight of zero to the entity for the particular time segment of the period of time in response to a determination that the entity is not to be included in the unified sample for the particular time segment of the period of time.

9. The non-transitory computer readable storage medium of claim 6, wherein the adaptable weights are weights applied to the entity based on how many individuals in a population the entity is to represent, wherein the adaptable weights for the entity are permitted to vary over different time segments in the period of time.

10. A method performed by an audience measurement computing system comprising: i) a semiconductor microprocessor device comprising a plurality of cores, wherein each of the cores is configured to operate independently, ii) a Field Programmable Gate Array (FPGA) comprising an array of logic gates, a plurality of configurable interconnections, and a storage circuitry, wherein the storage circuitry is distributed among the array of logic gates so as to increase execution speed, iii) a interface circuitry, and iv) a memory, the method comprising:

obtaining, via one or more network communications, entity data for a plurality of entities by:

obtaining, by a first sub-array of logic gates of the FPGA and via the one or more network communications, audience measurement data from meter devices disposed at a plurality of media exposure measurement locations, storing, by the storage circuitry of the FPGA, a first result of the obtaining of the audience measurement data from meter devices, obtaining, a second sub-array of logic gates of the FPGA and via the one or more network communications, return path data from media devices disposed at the plurality of media exposure measurement locations, and storing, by the storage circuitry of the FPGA, a second result of the obtaining of return path data from the media devices;

wherein each entity of the plurality of entities comprises: a person, or a household representing a media exposure measurement location, and wherein, for each entity of the plurality of entities: i) the entity data represents a period of time comprising a plurality of time segments, and ii) the entity data comprises: an entity identifier for the entity and, for each time segment in the period of time: an adaptable weight of the entity and a panel status of the entity; and determining, at each iteration of a plurality of iterations executed in parallel by the plurality of cores of the semiconductor microprocessor device, a unified weight for each respective entity of the plurality of entities, comprising, at each iteration:

averaging, by the respective core, the adaptable weights based on the panel statuses to determine the unified weight of the respective entity for the period of time, and outputting, by the plurality of cores of the semiconductor or microprocessor device and the interface circuitry, the unified weights of the plurality of entities to an external device.

11. The method of claim 10, further comprising:

applying a rule to the panel statuses of the entity to determine whether the entity is included in a unified sample for a particular time segment of the period of time, the rule based on whether the panel statuses indicated the entity met one or more requirements for inclusion in a panel for a specified percentage of time from a start of the period of time through the particular time segment of the period of time.

12. The method of claim 11, further comprising:

assigning a weight of zero to the entity for the particular time segment of the period of time in response to a determination that the entity is not to be included in the unified sample for the particular time segment of the period of time.

\* \* \* \* \*